Figure 1:
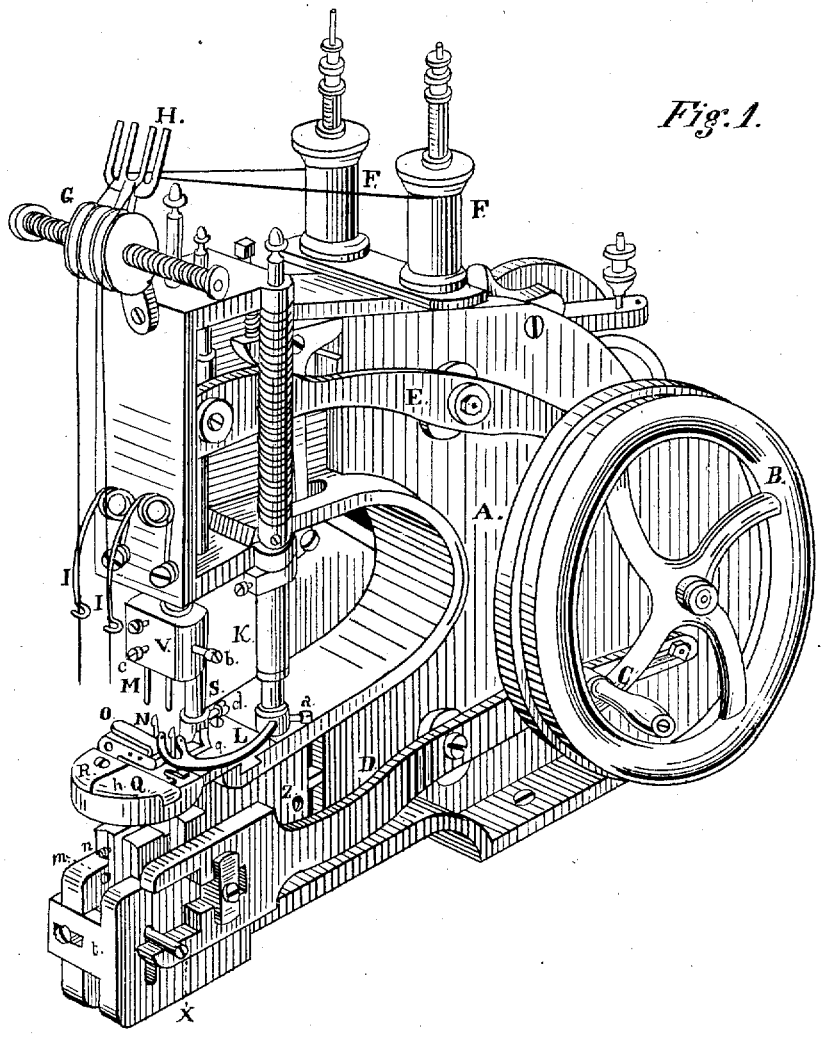

2 Sheets—Sheet 1.

E. SHAW.

SEWING-MACHINE.

No. 6,843. Reissued Jan. 4, 1876.

WITNESSES:

Henry Gerhard

A. Schwertenberger

INVENTOR.

Elijah Shaw

By J. Bennett his Atty in fact.

THE NORRIS PETERS CO., PHOTO-LITHO., WASHINGTON, D. C.

E. SHAW.
SEWING-MACHINE.
No. 6,843. Reissued Jan. 4, 1876.
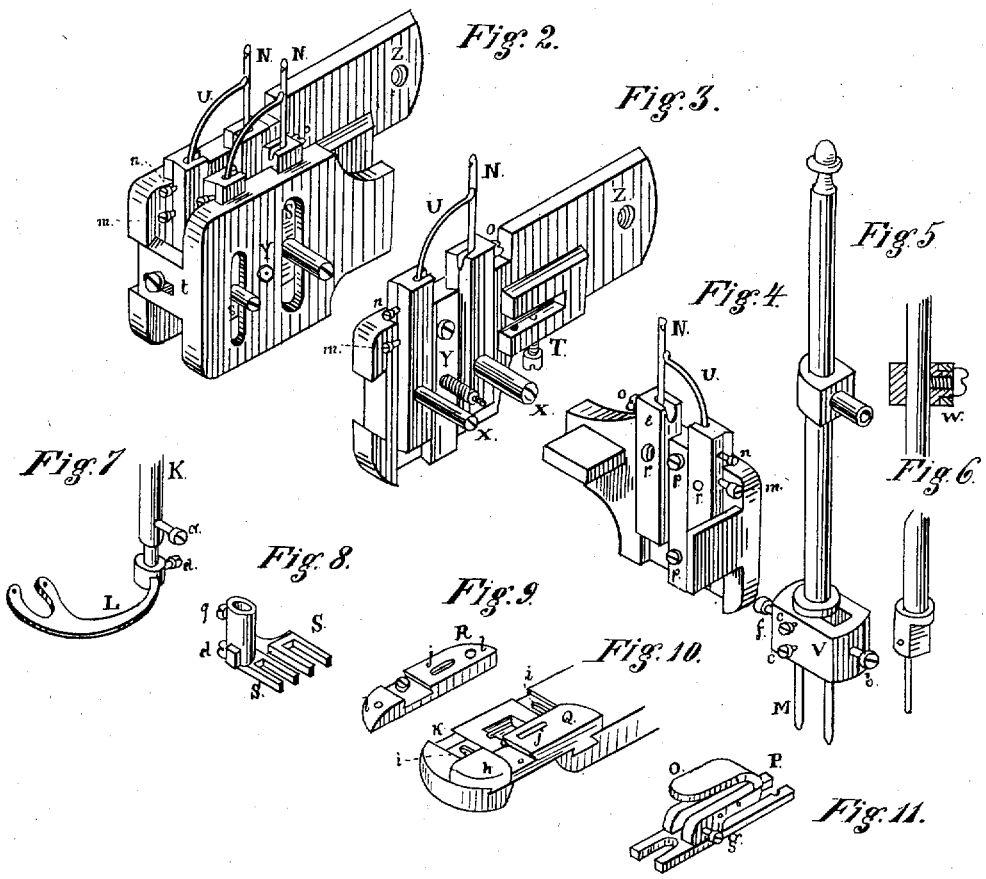
WITNESSES:
Henry Bedford
H. Schattenberg.
INVENTOR:
Elijah Shaw
By J. B. Smith
his Atty in fact.
THE NORRIS PETERS CO., PHOTO-LITHO., WASHINGTON, D. C.

UNITED STATES PATENT OFFICE.

ELIJAH SHAW, OF MILWAUKEE, WISCONSIN, ASSIGNOR OF ONE-HALF INTEREST TO CHARLES T. BRADLEY AND WILLIAM H. METCALF.

IMPROVEMENT IN SEWING-MACHINES.

Specification forming part of Letters Patent No. 132,326, dated October 15, 1872; reissue No. 6,843, dated January 4, 1876; application filed October 28, 1875.

*To all whom it may concern:*

Be it known that I, ELIJAH SHAW, of Milwaukee, in the county of Milwaukee and State of Wisconsin, have invented certain Improvements in Sewing-Machines, of which the following is a specification:

My invention consists in an arrangement of adjustable awls and hooked needles, supplied with thread by a double-thread guide, and operating in connection with a cord and lap-seam guide, to overlap the material and sew parallel lines of stitches.

Figure 1 is a perspective view of the machine; Fig. 2, a view of adjustable needles and loop-carriage; Fig. 3, a sectional view of adjustable needles and loop-carriage; Fig. 4, a sectional view of the other half of needles and loop-carriage. Fig. 5 is a view of the awl-bar, with adjustable awl-fastenings. Fig. 6 is a view of the awl-bar; Fig. 7, the adjustable thread-carrier; Fig. 8, the adjustable foot; Fig. 9, half of needle-plate; Fig. 10, other half of needle-plate; Fig. 11, lap-seam and cord gage.

A is the frame of the machine. B is the balance-wheel. C is the crank. D is the needle and looper arm. E is the awl-arm; F, the thread-spool; G, tension-rollers; H, thread-guides; I, tension-springs; K, thread-carrier bar; L, thread-carrier; M, the awls; N, needles; O, lap-seam and cord gage; P, end gage; Q and R, needle-plates; S, adjustable foot; T, set-screws, which hold adjustable needle-carriage in place. U U are cast-offs; V, adjustable awl-holder; W, adjustable collar on awl-bar, which performs the function of holding the awl-bar higher or lower, as it may be placed, and also for holding it so that the awls shall be in line with and exactly over the needles N; X X, guide-pins to the cast-off and needle-bars; Y, screw for adjusting the needles and cast-offs the proper distance apart; Z, a screw for attaching the needle and looper-carriage to the feed-bar; *a*, set-screw to adjust the thread-carrier the proper height; *b*, set-screw for setting awls in the holder; *c*, set-screw for adjusting movable awl-holder; *d*, set-screw to adjust the foot to the proper width; *e*, needle-bar; *f*, set-screw to hold awl in awl-bar; *g*, set-screw for setting lap-seam gage; *h h*, slides for adjusting needle-boards; *i i*, slots in needle-board for the needles and awls to pass through; *k*, slots in which the slides *h* move; *m m*, set-screws for fastening cast-offs in their sockets; *n*, screws for adjusting cast-offs to the needles; *o*, set-screws for setting needles in the needle-bars; *p p*, screws which hold a dovetail piece between needles and cast-off bars to hold them in their places; *q*, a set-screw which holds foot in bar; *r*, holes for guide-pins X X; *t*, loop and needle carriage.

The operation of my invention is as follows: By turning the crank the cams give motion to different parts of the machine. The awls pass down and pierce the holes in the leather, the thread being properly adjusted in the thread-carrier. When the needles have passed up to the proper height the thread-carrier will throw the thread over the barbs of the needles, the needles then passing down until the points come even with the points of the cast-offs. Then they and the needles pass down together until they get a proper distance below the needle-board to form the loop. These needles, awls, and cast-offs operate upon the thread in the usual manner. The gage is adjusted to lap the material the proper width, the edge of the material placed in the slots of the guide, and a cord or other filling may or may not fill the hole in the guide. The machine may then be started, and the boot-leg or other article will be sewed by two seams, with edges overlapped and raised between the same.

I claim as my invention—

1. The double-thread carrier, the double presser-foot, the two awls, two needles, and two cast-offs, in combination with a lap-seam gage, all constructed and operating substantially as set forth.

2. The combination of collar W, awl-bar, and adjustable awl-holder V, substantially as set forth.

3. The combination of adjustable needle-board, adjustable presser-foot, adjustable awl-holder, and adjustable needle-carriage, substantially as described.

ELIJAH SHAW.

Witnesses:

J. B. SMITH,

A. SCHATTENSBERG.